(12) United States Patent
Wonderlich et al.

(10) Patent No.: US 11,029,139 B2
(45) Date of Patent: Jun. 8, 2021

(54) WALLBOARD SCORE, SNAP AND EDGE APPEARANCE TEST PROCEDURE

(71) Applicant: UNITED STATES GYPSUM COMPANY, Chicago, IL (US)

(72) Inventors: Jerry D. Wonderlich, Overland Park, KS (US); John A. Koch, Plainfield, IL (US); Charles W. Cochran, Elkhorn, WI (US); Tim Lucas, Plainfield, IL (US); Jenner Omodt, Mendota Heights, MN (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 253 days.

(21) Appl. No.: 16/375,670

(22) Filed: Apr. 4, 2019

(65) Prior Publication Data
US 2020/0033111 A1    Jan. 30, 2020

Related U.S. Application Data

(60) Provisional application No. 62/711,174, filed on Jul. 27, 2018.

(51) Int. Cl.
*G01B 5/28* (2006.01)
*B26F 3/00* (2006.01)
*G01B 5/14* (2006.01)

(52) U.S. Cl.
CPC ............... *G01B 5/28* (2013.01); *B26F 3/002* (2013.01); *G01B 5/14* (2013.01)

(58) Field of Classification Search
CPC ............. B26F 3/002; G01B 5/28; G01B 5/14

USPC .................................................. 33/32.1, 533
See application file for complete search history.

(56) References Cited

U.S. PATENT DOCUMENTS

| | | | |
|---|---|---|---|
| 2,818,644 A * | 1/1958 | Crawford | G01B 3/20 30/293 |
| 4,610,157 A | 9/1986 | Vicki et al. | |
| 6,199,288 B1 * | 3/2001 | Gregory | B25H 7/02 33/32.2 |
| 6,270,399 B2 | 8/2001 | Gunn | |
| 6,868,883 B2 | 3/2005 | Benedetti | |
| 2003/0084980 A1 | 5/2003 | Seufert et al. | |
| 2006/0032066 A1 | 2/2006 | Nicholson | |

(Continued)

OTHER PUBLICATIONS

International Search Report from corresponding International Patent Application No. PCT/US2019/042109, dated Oct. 17, 2019.

(Continued)

*Primary Examiner* — George B Bennett
(74) *Attorney, Agent, or Firm* — Greer, Burns & Crain, Ltd.; Philip T. Petti; Pradip Sahu

(57) ABSTRACT

A procedure is provided for evaluating the score, snap and edge appearance of wallboard panels, and includes scoring a wallboard panel with a knife at a constant and known force using a benchtop board scoring device; snapping the scored panel in a Universal Board Testing Machine to measure the breaking force, forming a snapped panel edge; measuring a cleanliness of the snapped panel edge by placing a straight edge against the snapped panel edge and measuring gaps between the snapped panel edge and the straight edge in a plurality of locations on a face of the panel, and a plurality of locations on a back of the panel; and averaging all of the measured gaps to create an Index Score.

16 Claims, 12 Drawing Sheets

(56) References Cited

U.S. PATENT DOCUMENTS

| | | |
|---|---|---|
| 2006/0144497 A1 | 7/2006 | Capron |
| 2010/0252601 A1* | 10/2010 | Thibault ................. E04F 21/18 225/106 |
| 2011/0162220 A1* | 7/2011 | Vogeler ................ B26D 7/0006 33/27.03 |
| 2012/0186094 A1 | 7/2012 | Cornelius |
| 2015/0168122 A1* | 6/2015 | Cruickshanks .......... B25H 7/04 33/425 |
| 2018/0215059 A1* | 8/2018 | Rago ........................ B26D 1/04 |

OTHER PUBLICATIONS

Anonymous, "Designation: C 1396/C 1396M-04-Standard Specification for Gypsum Board", ASTM International (2004), pp. 1-7.
Anonymous, "Evaluation of the 1/2" DensGlass Gold Sheathing to ASTM C1177/C1177 M-06 for Georgia Pacific" (Project No. 2009-1167), Progressive Engineering Inc. (2010), 21 pages.
Anonymous, "GA-235-2017 Gypsum Board Typical Mechanical and Physical Properties", Gypsum Association (2017), pp. 1-8.
Dank, Michael G., "Fifty Years of Test and Measurement of Gypsum Drywall", Advances in Gypsum Technologies and Building Systems (2015), pp. 97-119.

* cited by examiner

WALLBOARD SCORE, SNAP AND EDGE APPEARANCE TEST PROCEDURE

RELATED APPLICATION

This application claims priority under 35 USC 119 from U.S. Provisional Application No. 62/711,174 filed Jul. 27, 2018, the contents of which are incorporated by reference.

BACKGROUND

The present invention relates to testing procedures and associated devices for construction materials, and more specifically to a procedure for consistently testing gypsum wallboard construction panels for their performance when scored and fractured along the score line.

It is customary among construction workers that when installing wallboard panels, the panels can be easily trimmed to size by scoring the paper facing with a utility knife, then impacting the panel by hand pressure along the score line to cause the panel to fracture. Such a procedure is sometime referred to as "scoring and popping," "scoring and breaking" or "scoring and snapping" the panel. If performed properly, the panel will neatly and completely fracture along the score line.

An improperly scored and snapped panel requires additional labor to create a true, square and clean edge. In addition, the conventional rasping or sanding procedure used to correct the snapped edge creates unwanted dust in the workplace. This extra effort, sometimes referred to as cleaning the edge, preferably results in a straight and relatively tight fitting joint between adjacent wallboard panels for proper joint finishing. Also, it has been found that different types of wallboard panels, and panels manufactured by different source companies, often have different scoring and snapping characteristics. Wallboard panels that require higher knife scoring forces, snapping forces and extra work to clean the board edges are less commercially desirable than panels with lower required forces and cleaner cut edges. It is desirable for practitioners, as well as wallboard manufacturers, to be able to evaluate competitive construction panels for their scoring and snapping performance.

Thus, there is a need for a procedure and associated apparatus for comparing manufactured wallboard panels as to their scoring and snapping or popping characteristics.

SUMMARY

The above-listed need is met or exceeded by the present wallboard quality test procedure that simply, objectively and relatively accurately measures the amount of force needed to score the wallboard or drywall panel, the amount of force to snap and break the panel along the scored line and the appearance of the cut edge. An Index score has been developed with this procedure that incorporates all three of these variables. A lower Index score indicates a wallboard panel that is preferable for a wallboard contractor to use over panels having a higher Index score.

Features of the present procedure are that it is simple and fast to perform, inexpensive and very discriminating in the data it produces. Factors of wallboard performance that are important to customers are accurately measured and monitored. The data from this procedure is useable to:

1) monitor and trend the above-listed wallboard contractor properties;
2) conduct future product quality improvement projects, to measure improvement in these desirable properties for customers;
3) evaluate changes in manufacturing processes, formulations and raw materials;
4) evaluate new products before market release;
5) monitor the performance of competitive products; and
6) evaluate samples as part of customer complaint investigations.

The present test procedure involves the following main steps:

1) Application of a specific and measurable knife score pressure to a 12"×16" wallboard panel sample, by use of a Benchtop Board Scoring Device, a suitable example of which is disclosed in U.S. Pat. No. 10,124,503 and incorporated by reference.
2) Snapping the scored panel sample, scored side face down, in a Universal Board Testing Machine. This machine is recognized by ASTM and is used for measurement of panel flexural strengths, to confirm compliance with ASTM and U.L. strength requirements. A lower snapping force with this new test indicates a contractor preferred attribute.
3) Measurement of the cleanliness/edge appearance of the cut panel edge, by placing a steel straight edge against the cut edge and measuring the gaps between the cut edge and the straight edge, three measurements on the face of the sample and three on the back, all six averaged together to obtain one numerical measurement. This measurement system passes a statistical Gage R&R study for repeatability and reproducibility. A lower number indicates a contractor preferred attribute.
4) An Index score is calculated by adding the knife score force, snap force and edge appearance values. The index score allows for quick statistical comparisons of test data between one manufacturer or product against others.

More specifically, a procedure is provided for evaluating the score, snap and edge appearance of wallboard panels, and includes scoring a wallboard panel with a knife at a constant and known force using a benchtop board scoring device; snapping the scored panel in a Universal Board Testing Machine to measure the breaking force, forming a snapped panel edge; measuring a cleanliness of the snapped panel edge by placing a straight edge against the snapped panel edge and measuring gaps between the snapped panel edge and the straight edge in a plurality of locations on a face of the panel, and a plurality of locations on a back of the panel; and averaging all of the measured gaps to create an Index Score.

In an embodiment, the wallboard panel is provided in a sample size of 12×16 inches. It is preferred that the force applied by the knife to score the sample panel is approximately 2.5 pounds, measured by a scale connected to an arm of the benchtop scoring device. It is also preferred that the weights applied to the arm for exerting that force are steel washers. The scoring is performed by a user grasping the power transmission device on the carriage of the benchtop scoring device and drawing the knife across the sample panel using a power transmission device, which is preferably a handle.

When performing the method, after the panel is scored by the knife, the panel is placed in the Universal Testing Apparatus so that a load is applied to the back of the panel, but along the score line created by the knife on the face of the panel. Next, the sample is removed from the Universal Testing Apparatus, which divides the panel into two halves, the halves are folded into an approximate 90-degree angle and the rear face paper of the panel is scored completely using a knife. One of the halves is used for measuring and evaluating the cleanliness of the edge. A straight edge is placed against the cut panel edge, preferably in parallel orientation to the edge, and gaps between the cut panel edge and the straight edge are measured at a plurality of spaced points. It is preferred that three such points are measured on each of a front and back surface of the panel. In a still further preferred embodiment, the measuring is performed at the edge of the back side and the front side of the panel at a first location 2 inches from an upper edge, a second location at a middle of the edge, and a third location 2 inches from a lower edge.

In another embodiment, a procedure is provided for evaluating the score, snap and edge appearance of wallboard panels, and includes scoring a wallboard panel with a knife at a force of 2.5 pounds using a benchtop board scoring device; snapping the scored panel in a Universal Board Testing Machine at a designated force level, forming a snapped panel edge; measuring a cleanliness of the snapped panel edge by placing a straight edge in parallel alignment against the snapped panel edge and measuring gaps between the snapped panel edge and the straight edge in three locations on a face of the panel, and three locations on a back of the panel; and averaging all of the measured gaps to create an Index Score.

DETAILED DESCRIPTION

Figure 1:
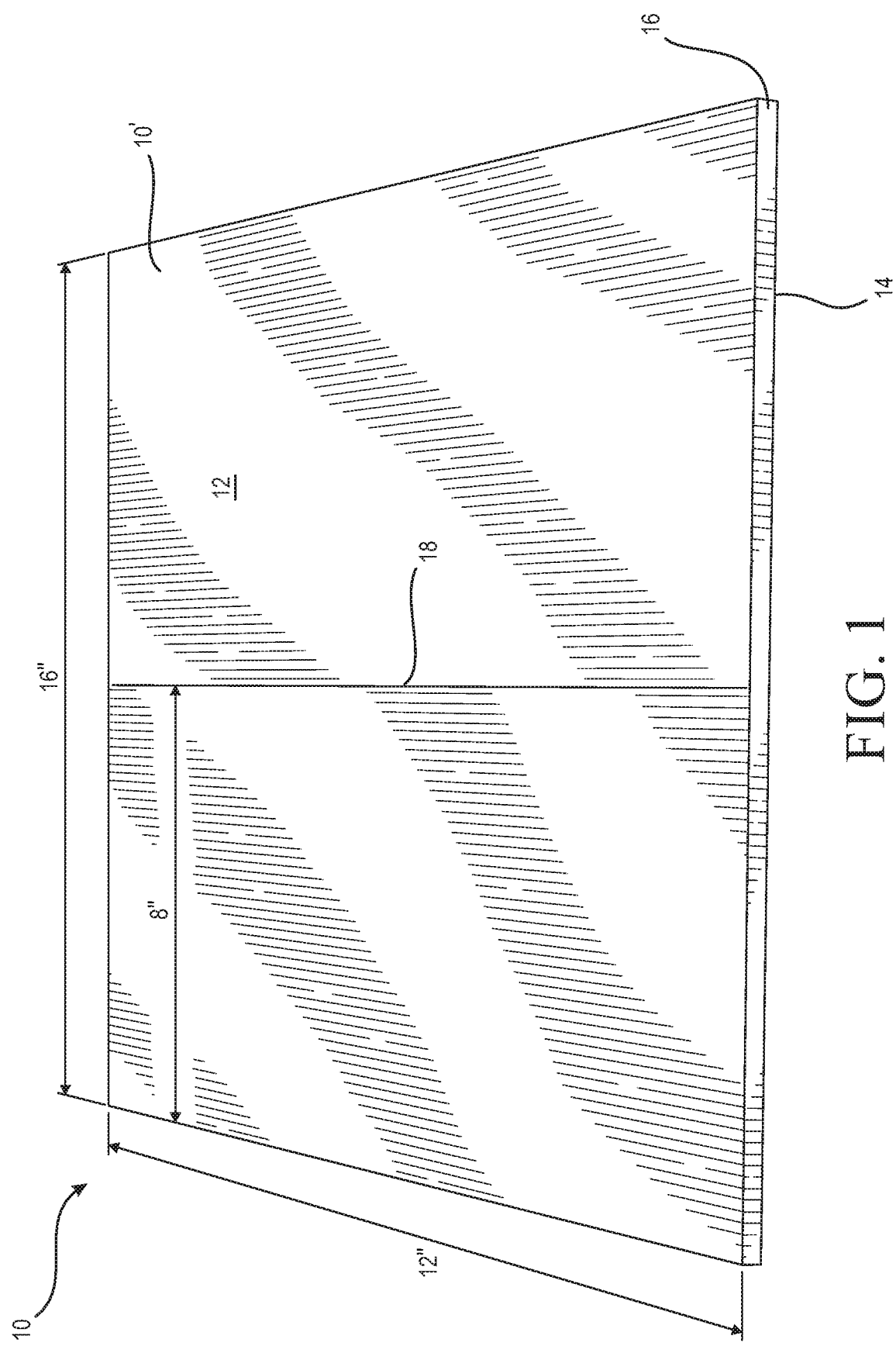
FIG. 1 is a top view of a wallboard panel used to provide samples for testing according to the present test procedure.
Figure 2:
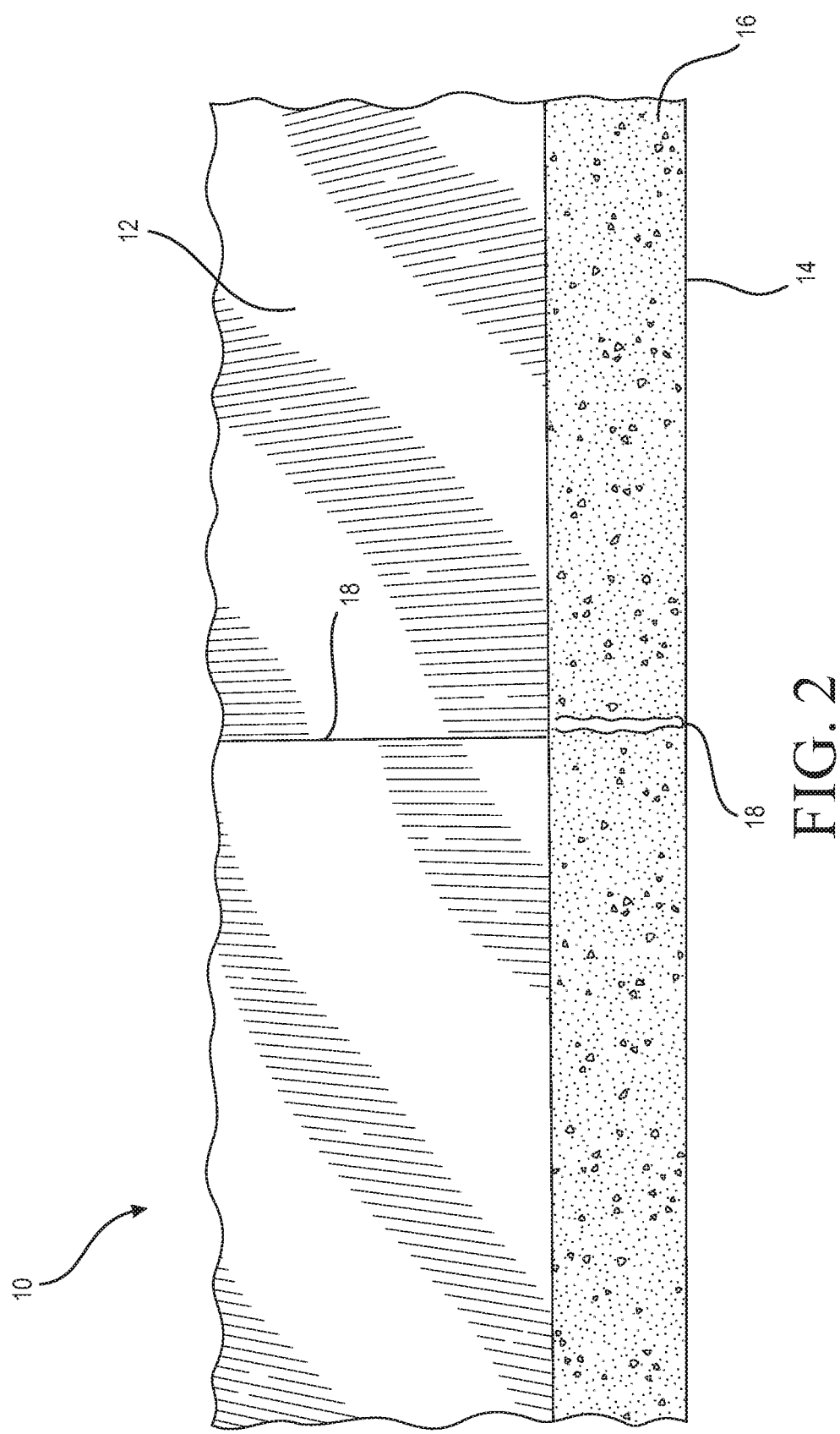
FIG. 2 is a side view of the panel of FIG. 1 showing a score line cut into the panel as part of the procedure.

Referring now to FIGS. 1 and 2, a wallboard panel is generally designated 10, and has a front or face paper side 12, a back side 14 and a peripheral edge 16. While the preferred panel 10 is paper-faced gypsum wallboard, other construction panels are considered suitable for the present process, as long as they are paper-faced. As is known in the art, the panel 10 is provided in 4'×8' sheets, as well as 4 feet wide and in 9, 10 and 12 foot lengths. For the present process, the panel 10 is cut to a smaller sample size, which may vary to suit the application, but in one embodiment is 12" X" 16". Since most panels are produced in a 4' width, this is referred to as the cross direction or the perpendicular direction. The long dimension is referred to as the parallel direction, since that side is parallel to the direction of travel as the panels are produced on a conveyor line. The sample panels are taken so that one 12"×16" sample is cut so that the 16" side is taken from the parallel direction, and one such sample panel is taken so that the 16" side is taken from the cross direction. It has been found that gypsum wallboard has stronger flexural strength when broken in the cross direction, so samples are taken from both the cross and parallel directions when testing the panels for flexural strength per the guidelines of Underwriters Laboratories (U.L.). Further, it is preferred that the present procedure be conducted at 70° F. and 50% relative humidity for maintaining consistency of panels tested.

In the present process, two such samples 10' are taken from the panel 10. The samples can include the tapered edge of the board sample. A 12" line 18 is marked on the face 12 of each sample 10' at the approximate midpoint of the 16" dimension, and scored or marked onto the peripheral edge 16 (FIG. 2). The line 18 is then transferred to the back side 14 of the sample. Next, the specimens 10' are conditioned at a temperature of 75°±2° F. in an atmosphere having a relative humidity of 50%±2% to have a constant weight.

Figure 3:
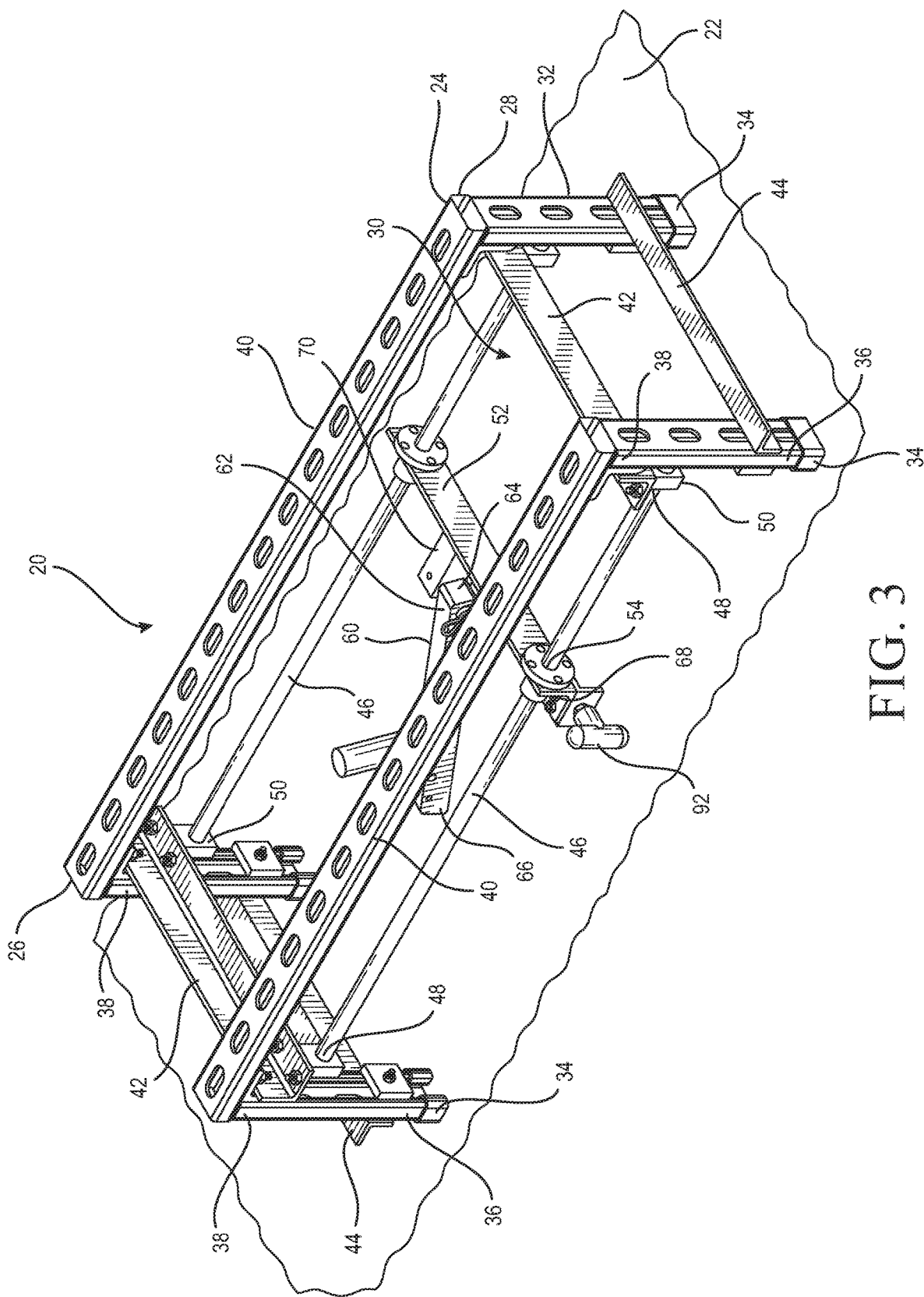
FIG. 3 is a top perspective view of a board scoring device suitable for use with the present procedure.
Figure 8:
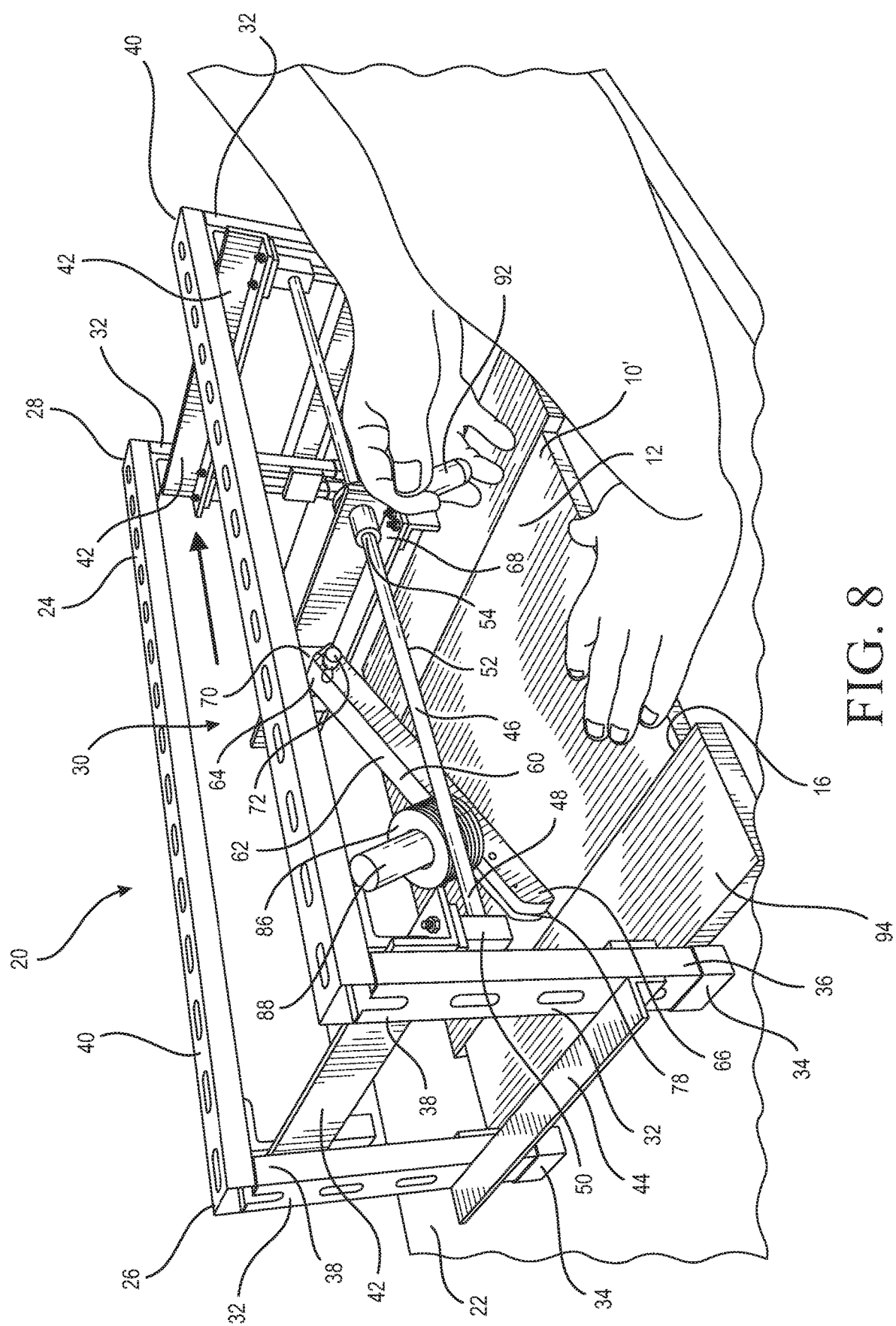
FIG. 8 is a top perspective view of the board scoring device of FIG. 3 in use performing the step of scoring the sample wallboard panel.

Referring now to FIGS. 3 and 8, a bench top scoring device is generally designated 20, is shown mounted on a substrate 22 such as a work table or the like. The device 20 is described in more detail in U.S. patent application Ser. No. 15/419,476 which is incorporated by reference. Included on the device 20 is a frame 24 having a first end 26 and an opposite second end 28, with a work area 30 defined between the first and second ends. Each of the first and second ends 26, 28 has at least one, and preferably a pair of legs 32 configured for contacting the substrate 22. In the preferred embodiment, each leg 32 is provided with a resilient, rubber-like foot 34 at a lower end 36. Opposite the lower end 36, each leg 32 has an upper end 38 which is connected to an elongate bar 40.

In the preferred embodiment, one of the elongate bars 40 is mounted between upper ends 38 of legs 32 at each of the first and second ends 26, 28. It is also preferred that the legs 32 and the elongate bars 40 are made of sturdy, lightweight material such as aluminum or the like. In the depicted embodiment, the elongate aluminum bars 40 are preferably perforated to reduce weight and cost. Also, at least one stabilizing bar 42 is mounted transversely to each of a pair of the elongate bars 40. For added structural support, a leg stabilizer 44 is connected to adjacent legs 32 at each of the two ends 26, 28. While other similar materials are contemplated, it is preferred that the stabilizer bar 42 and the leg stabilizer 44 are made of rigid, lightweight material such as aluminum, and formed as a conventional "L"-bracket stock. The frame components 32, 40, 42 and 44 are secured together to form a sturdy unit by brazing, welding, brackets, fasteners or the like as is known in the art.

A track 46 is connected to the frame 24, preferably between opposing leg stabilizers 44, and extends between the first end 26 and the second end 28. While other configurations are contemplated, it is preferred that the track 46 is made of a pair of generally cylindrical, parallel, solid rods, each extending between legs 32 at each of the opposing ends 26, 28, and mounted at or near a corresponding end 48 to a corresponding rod bracket 50 that depends from the leg stabilizer 34. The rod ends 48 are held in place in the bracket 50 by set screws, keys, a snap friction fit, chemical adhesive, welding or the like as is well known in the art.

Figure 4:
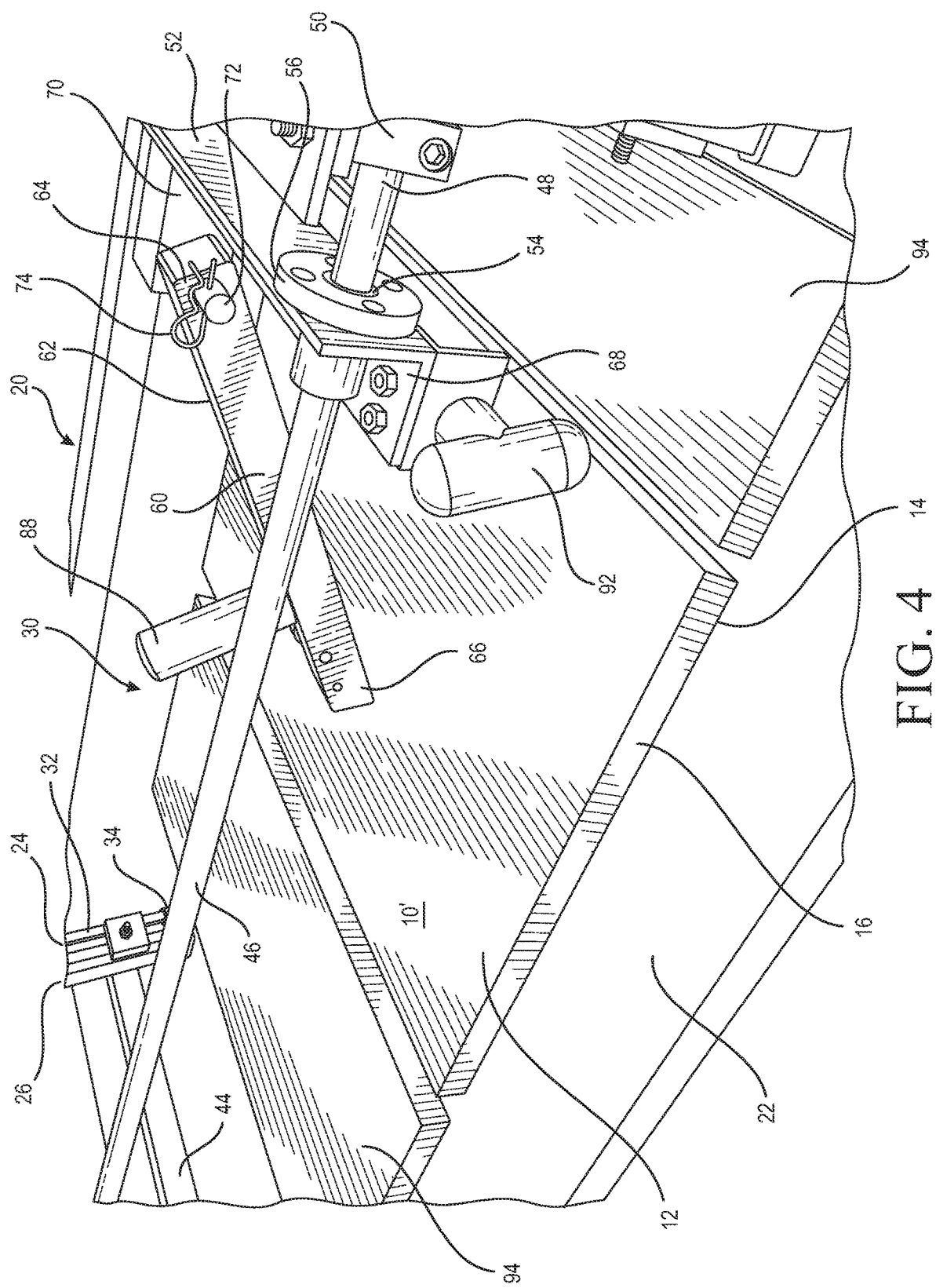
FIG. 4 is a fragmentary top perspective of the board scoring device of FIG. 3 arranged for scoring a sample wallboard panel.

Referring now to FIGS. 3, 4 and 8, a carriage 52 is slidably mounted to the track 46 for travel between the first and second ends 26, 28. While in the preferred embodiment, the carriage 52 is largely made of a length of aluminum "L"-bracket, other lightweight, rigid materials are contemplated. A pair of tube-like, low-friction, linear bearings 54 are each mounted using a flange 56 near a corresponding end of the carriage 52 preferably project towards the frame end 26, and are aligned with and slidably engage the rods of the track 46 to slidably reciprocate relative to the fixed track along a straight line. The orientation of the linear bearings 54 may vary to suit the application. Also, while the size of the linear bearings 54 may vary to suit the application, in the preferred embodiment they are 0.5-inch size.

Referring now to FIGS. 3-5, and 8, an arm 60 has an upper surface 62, a pivot end 64 pivotally connected to the carriage 52, and an opposite knife mount end 66. In the preferred embodiment, the arm 50 is mounted centrally on the carriage 42, however other positions are contemplated. The pivot end 54 is secured to a lower flange 68 (FIGS. 4, 8) of the carriage 52, preferably to a block 70 secured to the carriage 52 and having a laterally projecting stubshaft 72. A transverse bore in the pivot end 64 is designed to have a close tolerance with, and pivotally engages the stubshaft 72. A locking pin 74 such as a cotter pin engages a corresponding throughbore (not shown) in the stubshaft 72 for holding the arm 60 in place and creating a zero lash bearing, so that the arm pivots relative to the carriage 52 without any significant lateral play.

Referring now to FIGS. 4-8, the knife mount end 66 of the arm 60 includes a blade recess 76 constructed and arranged for receiving a replaceable knife blade 78 is secured. Although other blades are contemplated, the preferred knife blade 78 is a conventional shop knife blade known to practitioners in the wallboard installation field. A cutting edge 80 on the blade 78, when the blade is installed on the knife mount end 66, will rest on the substrate 22 and will project from the knife mount end at an angle α.

The knife blade 78 is further secured on the knife mount end 66 by a holding plate 82 having a threaded thumbscrew 84 (FIG. 5) engaging the blade recess 76. It is contemplated that the removal and reinstallation of the knife blade 78 is accomplished without the use of tools.

Referring now to FIGS. 3, 4, 5 and 8, another feature of the present bench top scoring device 20 is that a specific amount of weight is applied to the arm 60 to provide repeatable scoring performance. This weight or vertical force is applied by placing conventional steel washers 86 (FIGS. 6, 8). While other sorts of weights are contemplated, the washers 86 are preferably 1 1/16" inner diameter and are slidably mounted upon a weight post 88 associated with, and projecting from the upper surface 62 of the arm 60. Referring now to FIG. 6, a hand-held scale 90 such as an Imada Gauge is connected to the arm 60 at the knife cutting edge 80 and sufficient washers 86 are placed on the weight post 88 until a designated weight of the arm 60 is achieved. In the preferred embodiment, the applied weight is 2.5 pounds, however the amount of weight may vary to suit the application.

In the preferred embodiment, the weight post 88 has a diameter that is complementary to the conventional openings of steel washers and projects generally vertically from the upper surface 62 of the arm 60. In an especially preferred embodiment, the weight post 88 projects normally from the upper surface 62 of the arm 60. Further, the weight post 88 is optionally located on the arm 60 closer to the knife mount end 66 than to the pivot end 64.

Referring now to FIGS. 3, 4 and 8, a power transmission element 92 is connected to the carriage 52 for achieving user-generated movement of the carriage along the track 46. In the preferred embodiment, the power transmission element 92 is a handle, however a rope, cable chain or other similar device is contemplated, as long as a user can control the movement of the carriage 52 along the track 46.

Figure 5:
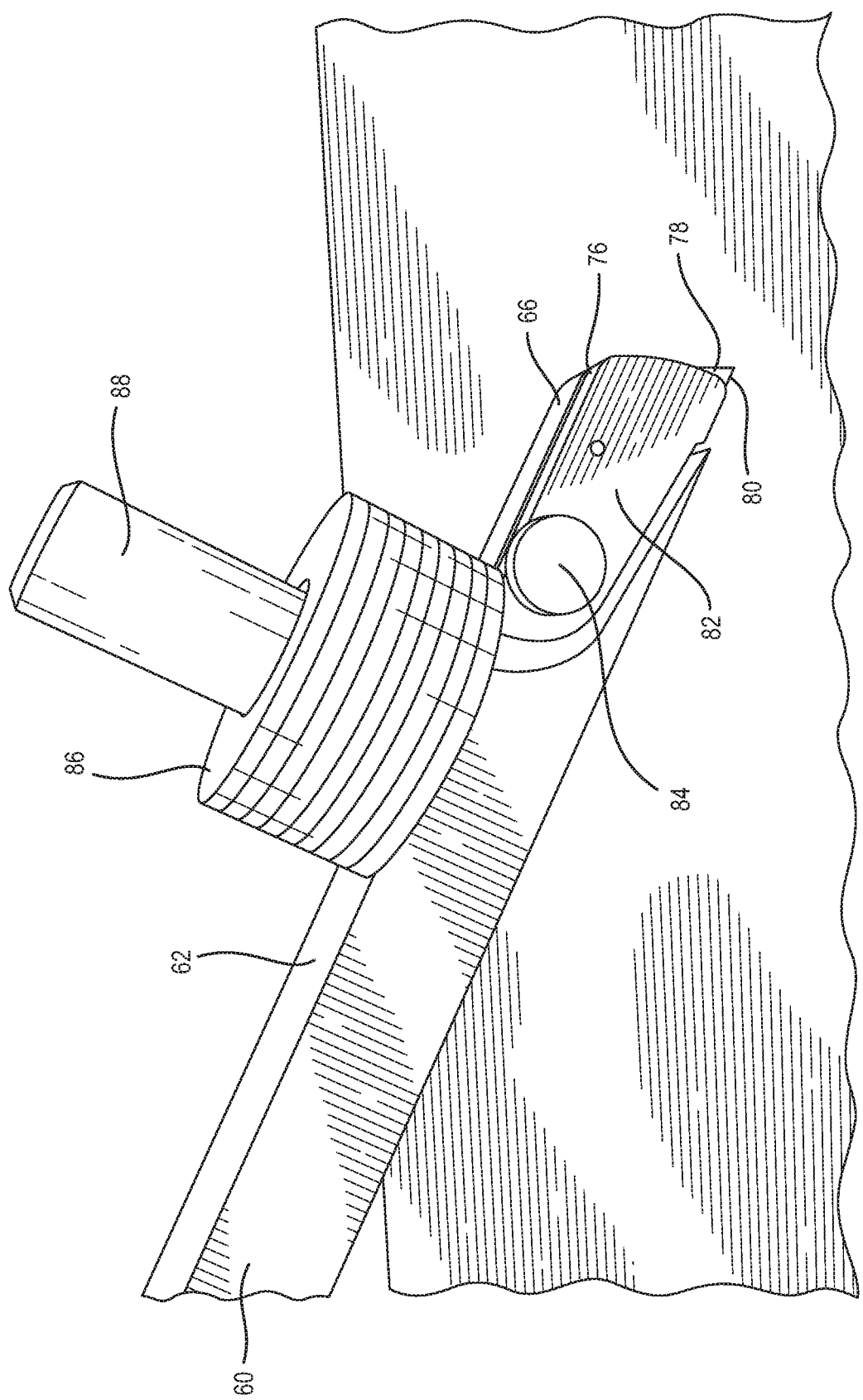
FIG. 5 is a side perspective view of a cutting arm of the board scoring device of FIG. 3 shown equipped with weights and a cutting blade.
Figure 6:
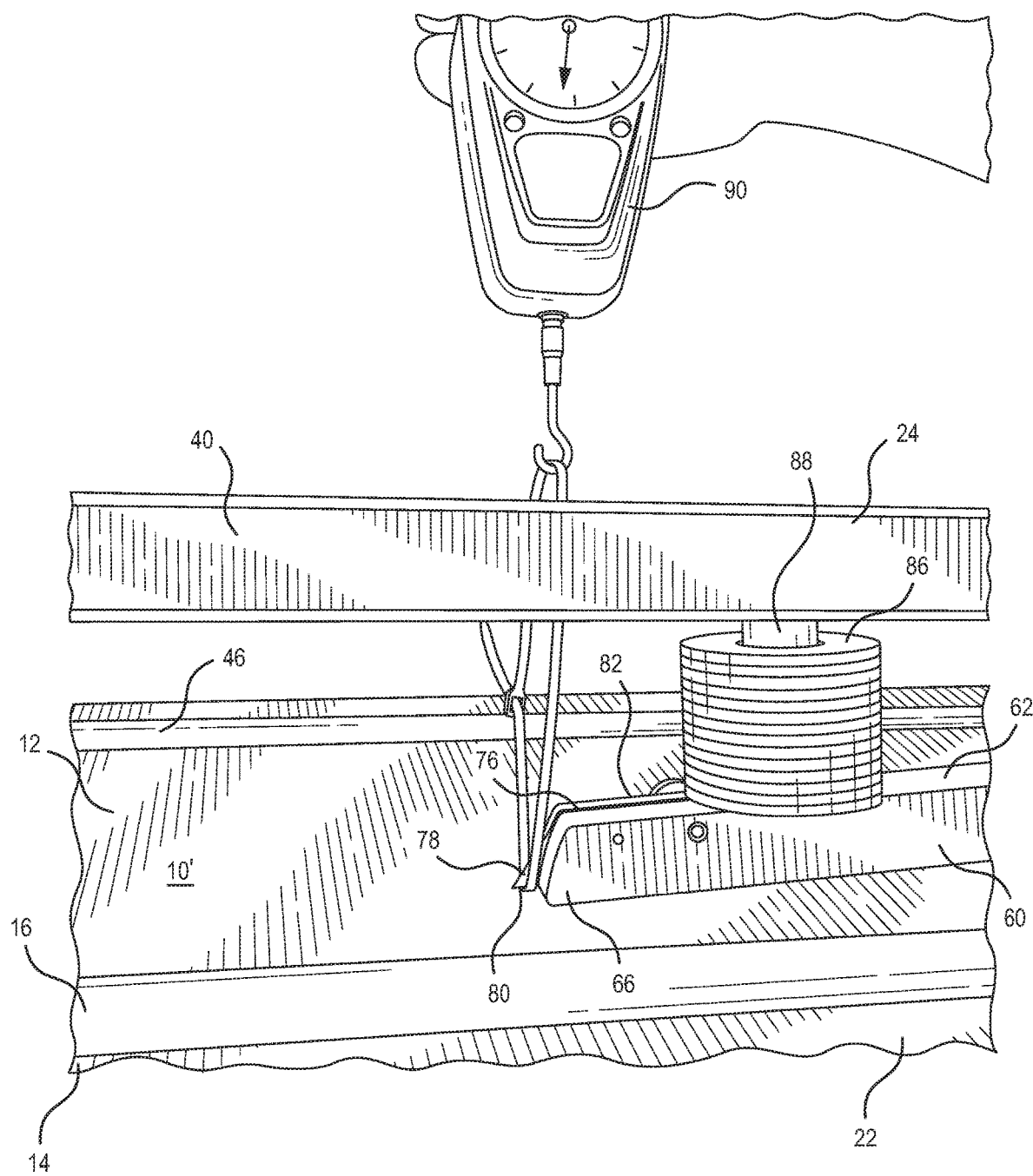
FIG. 6 is a side elevation of the board scoring device of FIG. 5 showing the step of calibrating the arm to have the appropriate weight.

Referring to FIGS. 4-6, to begin the process, the bench top scoring device 20 is placed upon the substrate 22 facing the operator. A knife blade 78 is inserted into the blade recess and secured using the thumbscrew 84. Washers 86 or other weights are placed on the weight post 88, and the scale 90 is attached to the knife edge 80 and the weight on the arm 60 is determined, until a desired weight is achieved, preferably 2.5±0.1 pounds or other weight, depending on the application. The combined weight of the weights 86 and the arm 60, are designed to approximate the force exerted by a typical wallboard installer when performing the scoring operation, and to quantify that force for comparison purposes.

Figure 7:
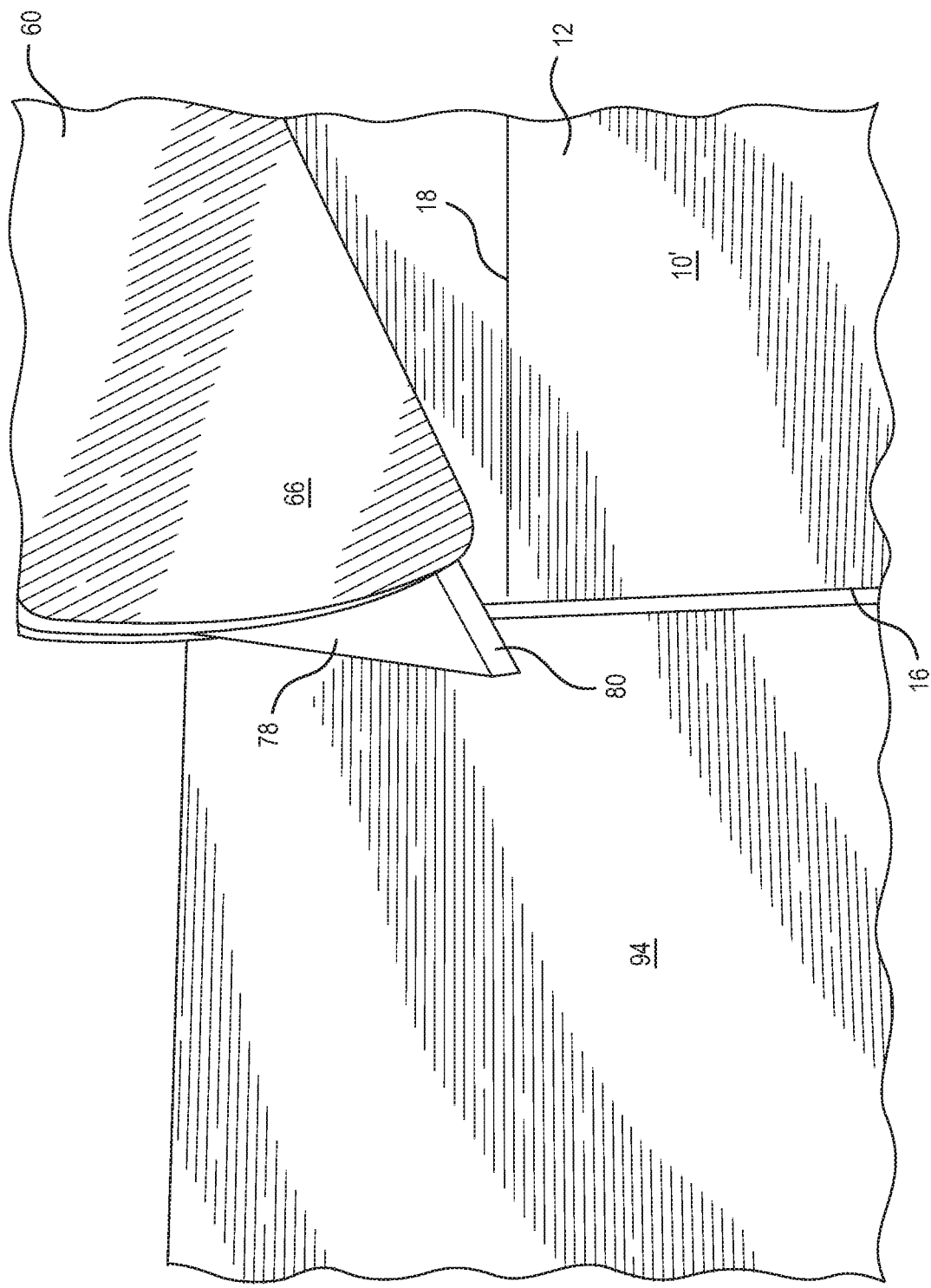
FIG. 7 is an enlarged view of the present cutting arm shown positioned over the wallboard panel to be tested.

Next, referring to FIGS. 7 and 8, a sample panel 10' is placed on the substrate 22 with the face paper side 12 facing up, and the user, manipulating the power transmission element 92, moves the carriage 52 so that the blade cutting edge 80 is at a starting position along the line 18 near the peripheral edge 16. It is preferred to place scrap panels 94 of wallboard on either side of the sample 10' on the substrate 22 so that the scrap panels are butt up against the sample 10'.

Grasping the power transmission element 92, the user draws the carriage 52 across the track 46, so that the cutting edge 80 of the knife blade 78 travels across and scores the sample 10' along the marked line 18, due to the weight exerted by the arm 60 due to the washers 86 on the weight post 88. One of the operator's hands is preferably on the power transmission element 92, and the other preferably rests on the sample 10' to hold it in place. The operator completes the scoring once the knife blade 78 is resting on the rear or the right-most scrap panel 94. An advantage of the Bench Top Scoring Device 20 is that it standardizes the creation of the scoring line along the marked line 18, but creates the scoring line in the same manner as a typical wallboard installer.

Figure 9:
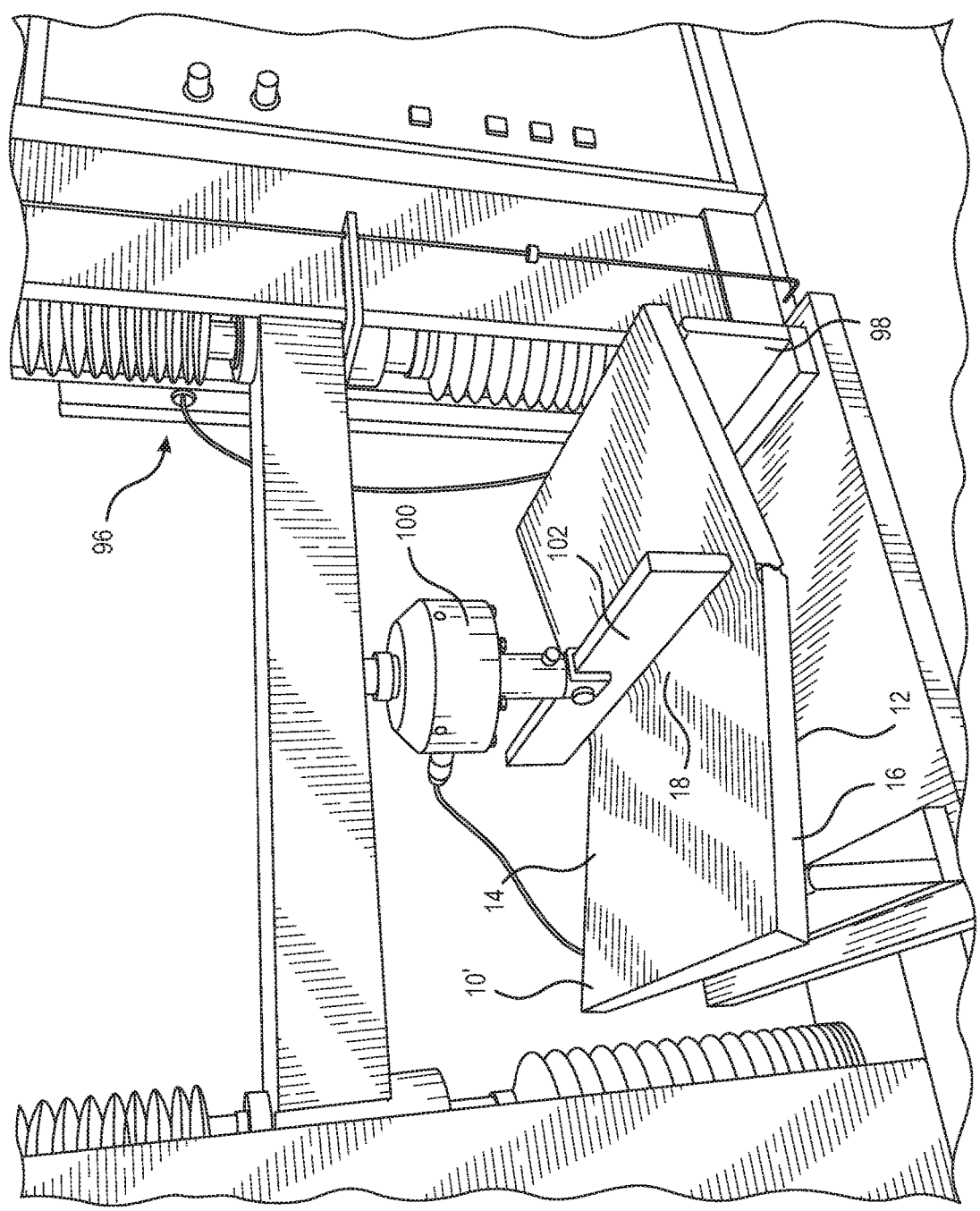
FIG. 9 is a front perspective view of the sample wallboard panel being snapped by a Universal Testing Device.

Referring now to FIG. 9, after scoring, the sample 10' is placed face paper 12 down in an ATS Universal Testing machine 96. Once the sample 10' is placed on a rack 98 that supports the sample near end edges, a vertically movable ram 100 having an elongate ram blade 102 positioned along the line 18 exerts sufficient vertical force to snap the sample along the score line according to the procedure set forth in ASTM C473. The machine 96 is set to a highest rate of loading for this operation, and the operator records the amount of force needed to snap the sample 10', which will vary depending on the type and formulation of wallboard panel 10.

Figure 10:
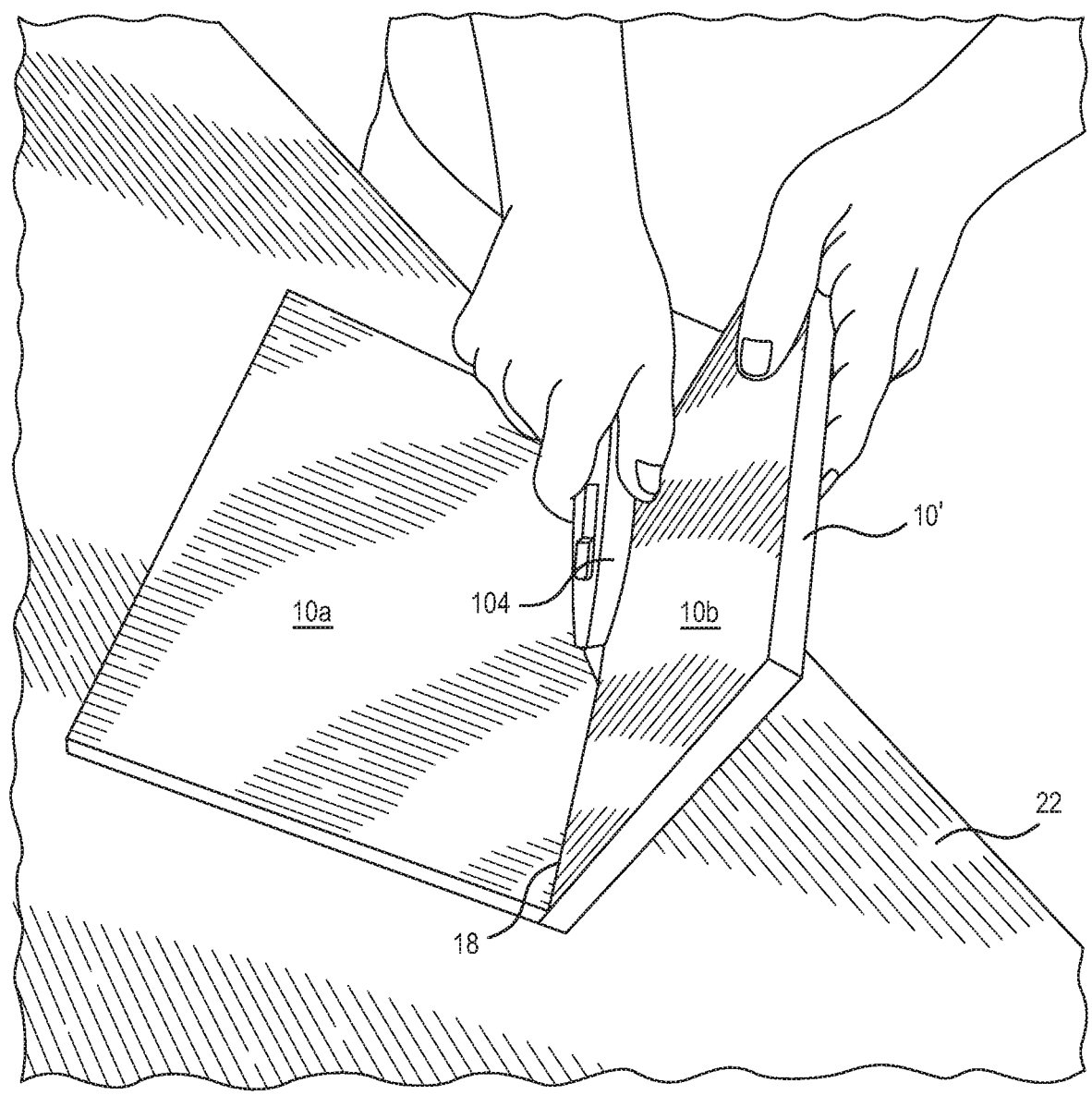
FIG. 10 is a top perspective view of the wallboard panel sample being separated by folding and scoring the back paper, and snapping the panel.

Referring now to FIG. 10, once the sample 10' is removed from the Universal Testing machine 96, the broken or snapped sample 10' is separated into two halves, 10a and 10b, by folding as shown into an approximate 90-degree position and scoring the back paper completely from end to end with a utility or safety knife 104.

Figure 11:
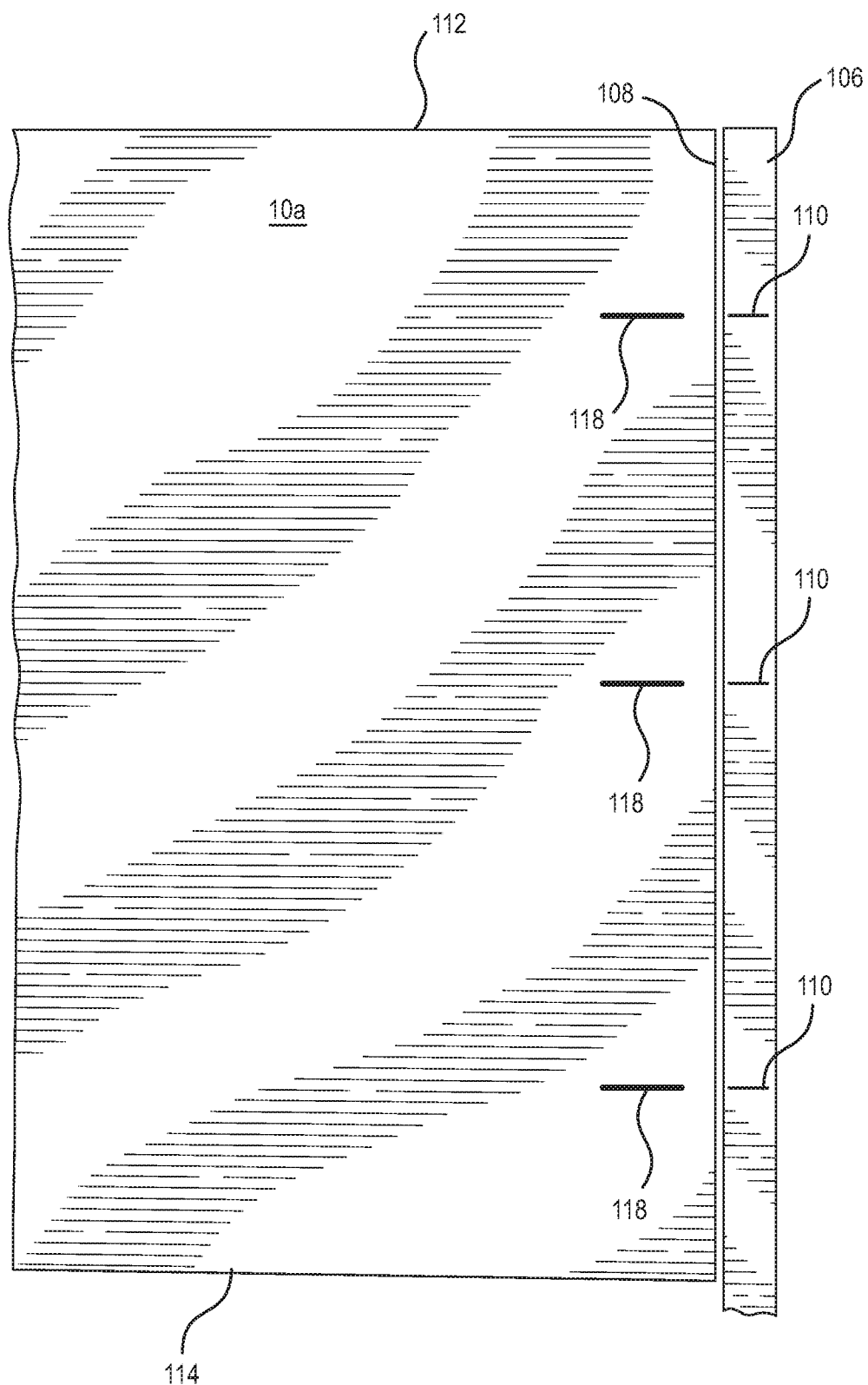
FIG. 11 is a top view of the step of comparing the scored, snapped edge of the wallboard panel with a straight edge at various points.
Figure 12:
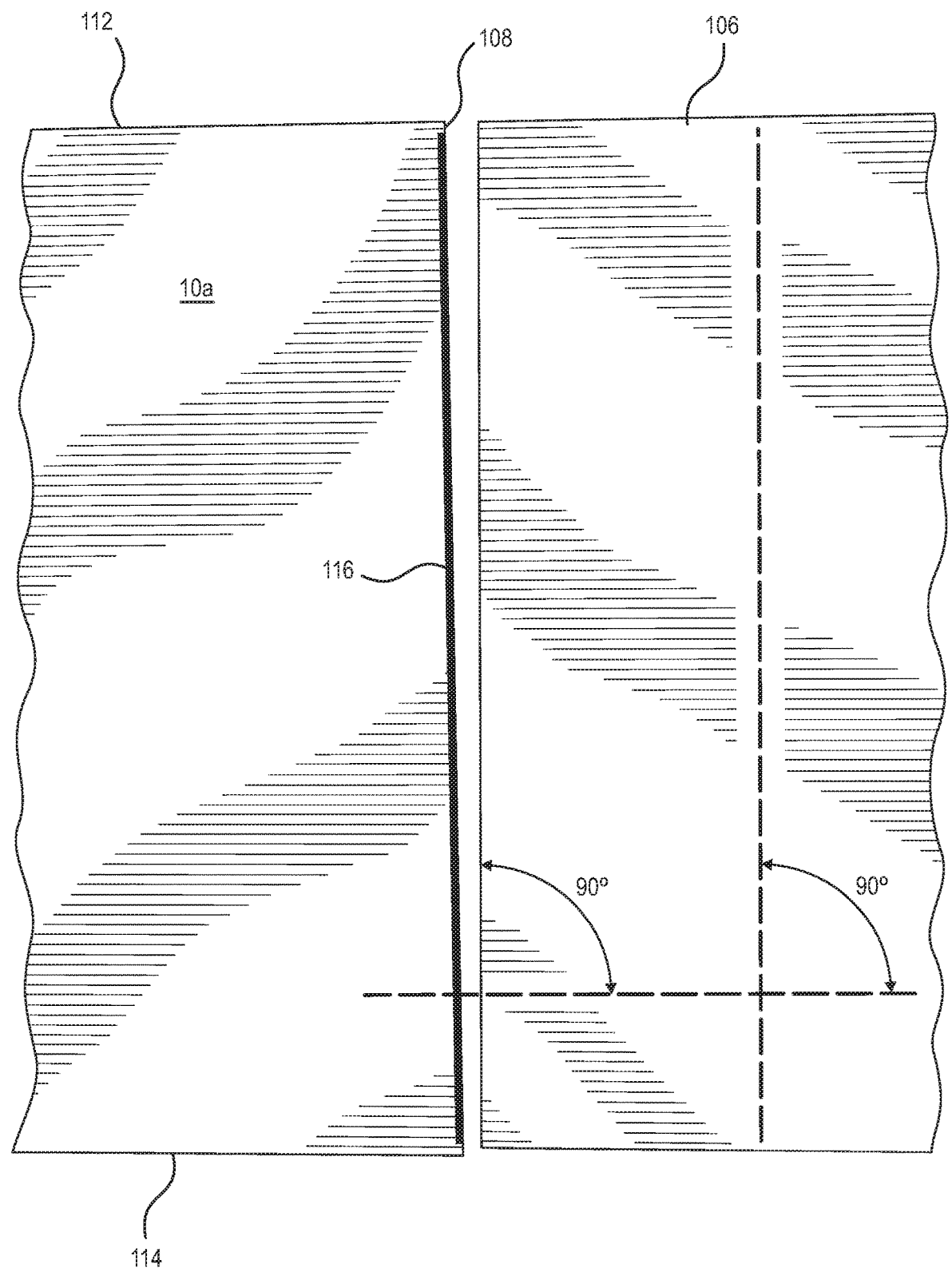
FIG. 12 is a sample wallboard panel with a setup diagram for the straight edge shown in FIG. 11.

Referring now to FIGS. 11 and 12, the operator then uses one of the halves 10a, 10b to measure and evaluate the snapped panel edge. A straight edge 106, such as a rigid ruler, or length of steel or aluminium bar stock, with a preferred dimension of ½"×½"×12" or the like which is variable depending on the application, is placed close to a snapped panel edge 108, and assigned measurement points 110 are located in axially spaced position on the straight edge 106 to form designated points of comparison. In the preferred embodiment, the points 110 are located approximately 2-inches from upper and lower edges 112, 114 of the sample 10' and in the middle of the sample, approximately 6 inches from the upper and lower edges. The straight edge 106 is placed in a parallel position relative to the snapped panel edge 108, with respect to an imaginary line 116 (FIG. 12) along the snapped panel edge 108 and as close as possible to the edge, with the understanding that, depending on the type of panel being tested, the scoring and snapping characteristics of the board may vary, resulting in an irregular cut edge that makes it difficult to place the straight edge 106 sufficiently close to the snapped panel edge 108. In FIG. 12, the straight edge 106 is shown as a larger panel, and a technique for proper alignment of the straight edge with the imaginary line 116 corresponding to the snapped panel edge 108 is shown.

During the evaluation, the straight edge 106 is aligned with the upper and lower sample edges 112, 114 so that the measurement points 110 are aligned on the panel 10a, 10b and the straight edge 106. Corresponding measurement points 118 are marked on the panel to match up with the points 110 on the straight edge 106. The straight edge 106 is placed close enough to the snapped panel edge 108 until the straight edge first touches any core protrusion of the sample 10a, 10b.

With the straight edge 106 in contact with the outermost core protrusion, the operator measures the distance between the straight edge 106 and the snapped panel edge 108 at the three measurement points 116 on the face paper side 12, then repeats the same process on the back side 14, to generate six measurements. The order of measuring the distance between the points 110, 116 on the respective sides 12, 14 is not critical to the present process. It is preferable to use a 50 metric millimeter scale to generate the measurements, however other scales are contemplated depending on the application. All measurements are made from the edge of the straight edge 106 to the snapped panel edge 108 of the paper/core line on the adjoining board specimen, to the nearest graduated mark on the 50 scale of the metric ruler. It is preferred to make measurements to the nearest graduated mark; a "one" reading is the lowest reading to be recorded. Once the six measurements are collected, they are averaged to create an Index.

The preferred Index is achieved using the following formula:

(Score force, lbs.)+(Gap Average)+(0.1×Snap Force, lbs.).

The Score Force is the amount of weight in pounds (lbs.), recorded on the Imada Gauge 90 (FIG. 6), during a Score Force calibration process. The Snap Force is the recorded force needed by the ATS Universal Testing machine to snap the sample 10'.

Referring to Table 1, below, according to the results of a Gage R&R study, a commonly used statistical tool that measures the amount of variation in a measurement system due to the measurement device and the people taking the measurements, the present measurement system is valid.

TABLE 1

Gage R&R

| Source | VarComp | % Contribution (of VarComp) | |
|---|---|---|---|
| Total Gage R&R | 0.030784 | 3.95 |  |
| Repeatability | 0.023378 | 3.00 | |
| Reproducibility | 0.007406 | 0.95 | |
| Operators | 0.007406 | 0.95 | |
| Part-To-Part | 0.749049 | 96.05 | |
| Total Variation | 0.779833 | 100.00 | |

| Source | StdDev (SD) | Study Var (6 × SD) | % Study Var (% SV) | |
|---|---|---|---|---|
| Total Gage R&R | 0.175454 | 1.05272 | 19.87 |  |
| Repeatability | 0.152898 | 0.91739 | 17.31 | |
| Reproducibility | 0.086059 | 0.51635 | 9.75 | |
| Operators | 0.086069 | 0.51635 | 9.76 | |
| Part-To-Part | 0.865476 | 5.19286 | 98.01 | |
| Total Variation | 0.883082 | 5.29849 | 100.00 | |

Number of Distinct Categories = 6 

While a particular embodiment of the present wallboard, score snap and edge appearance test procedure has been described herein, it will be appreciated by those skilled in the art that changes and modifications may be made thereto without departing from the invention in its broader aspects and as set forth in the following claims.

The invention claimed is:

1. A procedure for evaluating the score, snap and edge appearance of wallboard panels, comprising:
    scoring a wallboard panel with a knife at a constant and known force using a benchtop board scoring device;
    snapping the scored panel in a Universal Board Testing Machine to measure the breaking force, forming a snapped panel edge;
    measuring a cleanliness of the snapped panel edge by placing a straight edge against the snapped panel edge and measuring gaps between the snapped panel edge and the straight edge in a plurality of locations on a face of the panel, and a plurality of locations on a back of the panel; and
    averaging all of the measured gaps to create an Index Score.

2. The procedure of claim 1, further including providing the wallboard panel in a sample size of 12 inches×16 inches.

3. The procedure of claim 1, wherein said benchtop scoring device includes:
    a frame having a first end and an opposite second end, a work area defined between said first and second ends, each end having at least one leg configured for contacting a substrate;
    a track connected to said frame and extending between said first end and said second end;

a carriage slidably mounted to said track for travel between said first end and said second end;

an arm having an upper surface, a pivot end pivotally connected to said carriage, and an opposite knife mount end;

a knife blade mounted to said knife mount end;

a power transmission element connected to said carriage for achieving user-powered pulling movement of said carriage along said track, said arm pivoting along an axis transverse to a direction of said movement of said carriage along said track; and a weight post associated with, and projecting from said arm, and constructed and arranged for receiving weights for exerting a force on said arm.

4. The procedure of claim 3, wherein said scoring is performed by a user grasping the power transmission device on the carriage and drawing the knife across the sample panel.

5. The procedure of claim 3, wherein said power transmission device is a handle.

6. The procedure of claim 1, wherein said constant and known force applied to the panel is achieved by adding sufficient weights to the weight post to provide 2.5 lbs of tension when a scale is placed on the arm.

7. The procedure of claim 6, wherein said weights are steel washers.

8. The procedure of claim 1, further including placing a desired sample panel under the bench top scoring device, and further placing strips of wallboard at each of a first and second edge of the panel in the direction of travel of a knife on the bench top scoring device.

9. The procedure of claim 1, wherein the sample panel is placed on the Universal Testing Apparatus so that a load is applied to a back of the panel along the score line created by the knife on the front of the panel.

10. The procedure of claim 9, wherein the sample is removed from the Universal Testing Apparatus, which divides the panel into two halves, the halves are folded into an approximate 90-degree angle and the rear face paper of the panel is scored completely using a knife.

11. The procedure of claim 10, wherein one of the halves is used for measuring the edge appearance.

12. The procedure of claim 1, wherein said measuring step further includes measuring the gap between the snapped panel edge and the straight edge in three locations on the face of the panel, and three locations on the back of the panel.

13. The procedure of claim 12, wherein said measuring step further including measuring the edge at at least one of the back side and the front side of the panel at a first location 2 inches from one of an upper and lower edge, a second location at a middle of the edge, and a third location 2 inches from the other of the upper and lower edge.

14. The procedure of claim 1, wherein said measuring step further includes positioning the straight edge relative to the snapped panel edge so that said straight edge is parallel to a hypothetical snapped edge of the panel.

15. The procedure of claim 1, wherein said Index is calculated as follows:

$$(\text{Score force,lbs.}) + (\text{Gap Average}) + (0.1 \times \text{Snap Force, lbs.}).$$

16. A procedure for evaluating the score, snap and edge appearance of wallboard panels, comprising:

scoring a wallboard panel with a knife at a force of 2.5 pounds using a benchtop board scoring device;

snapping the scored panel in a Universal Board Testing Machine at a designated force level, forming a snapped panel edge;

measuring a cleanliness of the snapped panel edge by placing a straight edge in parallel alignment against the snapped panel edge and measuring gaps between the snapped panel edge and the straight edge in three locations on a face of the panel, and three locations on a back of the panel; and averaging all of the measured gaps to create an Index Score.

* * * * *